(12) United States Patent
Scholte-Wassink

(10) Patent No.: US 7,922,449 B2
(45) Date of Patent: Apr. 12, 2011

(54) PASSIVE DEICING FOR WIND TURBINE BLADES

(75) Inventor: Hartmut A. Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/502,565

(22) Filed: Jul. 14, 2009

(65) Prior Publication Data

US 2010/0135787 A1 Jun. 3, 2010

(51) Int. Cl.
*F03D 7/04* (2006.01)

(52) U.S. Cl. .................. 416/1; 416/35; 416/37; 416/39; 416/61; 415/118

(58) Field of Classification Search ................ 416/1, 35, 416/37, 39, 61; 415/118; 29/44, 55
See application file for complete search history.

(56) References Cited

U.S. PATENT DOCUMENTS

| | | | |
|---|---|---|---|
| 4,435,646 A * | 3/1984 | Coleman et al. | 290/44 |
| 6,523,781 B2 * | 2/2003 | Ragner | 244/153 R |
| 6,890,152 B1 | 5/2005 | Thisted | |
| 7,086,834 B2 * | 8/2006 | LeMieux | 416/1 |
| 7,126,236 B2 | 10/2006 | Harbourt et al. | |
| 7,217,091 B2 | 5/2007 | LeMieux | |
| 2008/0078228 A1 * | 4/2008 | Nies | 73/1.01 |

FOREIGN PATENT DOCUMENTS

JP 2004084527 A * 3/2004

* cited by examiner

*Primary Examiner* — Igor Kershteyn
(74) *Attorney, Agent, or Firm* — William F. Heinze; Ernest G. Cusick; Frank A. Landgraff

(57) ABSTRACT

A method of operating a wind turbine having rotor with at least one blade, includes sensing an icing hazard for the blade; and moving the at least one blade into a position to reduce the icing hazard.

16 Claims, 3 Drawing Sheets

PASSIVE DEICING FOR WIND TURBINE BLADES

1. TECHNICAL FIELD

The subject matter described here generally relates to fluid reaction surfaces with a method of operation including control means which is temperature or icing condition responsive, and, more particularly, to passive deicing for wind turbine blades.

2. RELATED ART

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub 9 to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that may receive input from an anemometer 18. The anemometer 18 often includes a vane or other device for determining wind direction which the control system 16 then uses to rotate the "bearing" of the nacelle 6 on its vertical "yaw" axis in order to position the hub 9 into the wind.

The blades 10 generate lift and capture momentum from moving air that is them imparted to a rotor as the blades spin in the "rotor plane." Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

"Angle of attack" is a term that is used in to describe the angle between the chord line of the blade 10 and the vector representing the relative motion between the blade and the air. "Pitching" refers to rotating the angle of attack of the entire blade 10 into or out of the wind in order to control the rotational speed and/or absorption of power from the wind. For example, pitching the blade "towards feather" rotates the leading edge of the blade 10 into the wind, while pitching the blades "towards stall" rotates the leading edge of the blade out of the wind. A fully stalled turbine blade 10, when stopped, typically has the flat side of the blade facing substantially into the wind in an orientation that is sometimes referred to as "zero degrees pitch." A fully feathered turbine blade 10 is arranged with the leading edge of the blade directed substantially into the wind in an orientation that is sometimes referred to as "ninety degrees pitch."

For so-called "pitch controlled" wind turbines, the pitch may be adjusted each time the wind changes in order to maintain the rotor blades at the optimum angle and maximize power output for all wind speeds. For example, the control system 16 may check the power output of the turbine 2 several times per second. When the power output becomes too high, the control system 16 then sends a signal to the blade pitch mechanism (not shown) which causes the blades 10 to be pitched slightly out of the wind. The blades 10 are then turned back into the wind when the wind speed slows down.

Commonly-assigned U.S. Pat. No. 7,126,236 discloses "Methods and Apparatus for Pitch Control Power Conversion" and is reproduced in FIG. 2 where the control system 16 (from FIG. 1) includes one or more controllers within control panel 112 for overall system monitoring and control including pitch and speed regulation, high-speed shaft and yaw brake application, yaw and pump motor application and fault monitoring. However, alternative distributed or centralized control architectures may also be used.

The control system 16 provides control signals to the variable blade pitch drive or actuator 114 to control the pitch of blades 10 (FIG. 1) that drive hub 9. The drive train 8 (FIG. 1) of the wind turbine 2 includes a main rotor shaft 116 (also referred to as a "low speed shaft") connected to the hub 9 and the gear box 12. A high speed shaft from the opposite end of the gear box is used to drive a generator 120. In some configurations, torque is transmitted via a coupling 122. Yaw drive 124 and yaw deck 126 provide a yaw orientation system for wind turbine 2. In some configurations, the yaw orientation system is electrically operated and controlled by the control system 16 in accordance with information received from one or more sensors.

Icing frequently adversely affects performance of the blades 10 in cold climates. For example, icing can change the aerodynamic profile of the blade and consequently its overall efficiency. In addition, non-uniform icing on the turbine blades 10 can create asymmetric loads which cause the blades and/or other components of the wind turbine 2 to vibrate, sometimes catastrophically. Moreover, pieces of ice can sometimes break off of one of the blades 10, damaging the other blades, nearby structures, and/or injuring personnel. At times, these icing problems can be so severe that they prevent the wind turbine 2 from producing power despite otherwise ideal wind conditions.

BRIEF DESCRIPTION OF THE INVENTION

These and other aspects of such conventional approaches are addressed here in by providing, in various embodiments, a method of operating a wind turbine having a rotor with at least one blade, including sensing an icing hazard for the blade; and moving the at least one blade into a position to reduce the icing hazard.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
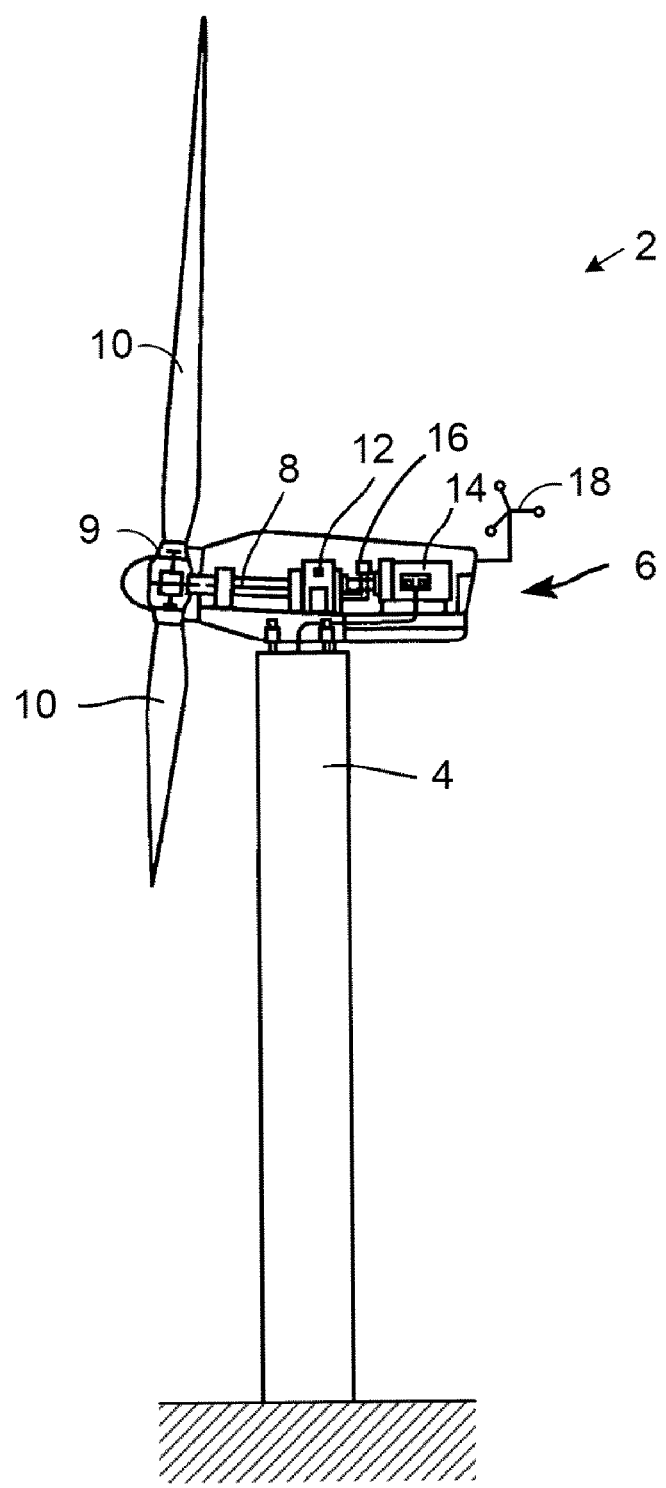
FIG. 1 is a schematic side view of a conventional wind turbine.
Figure 2:
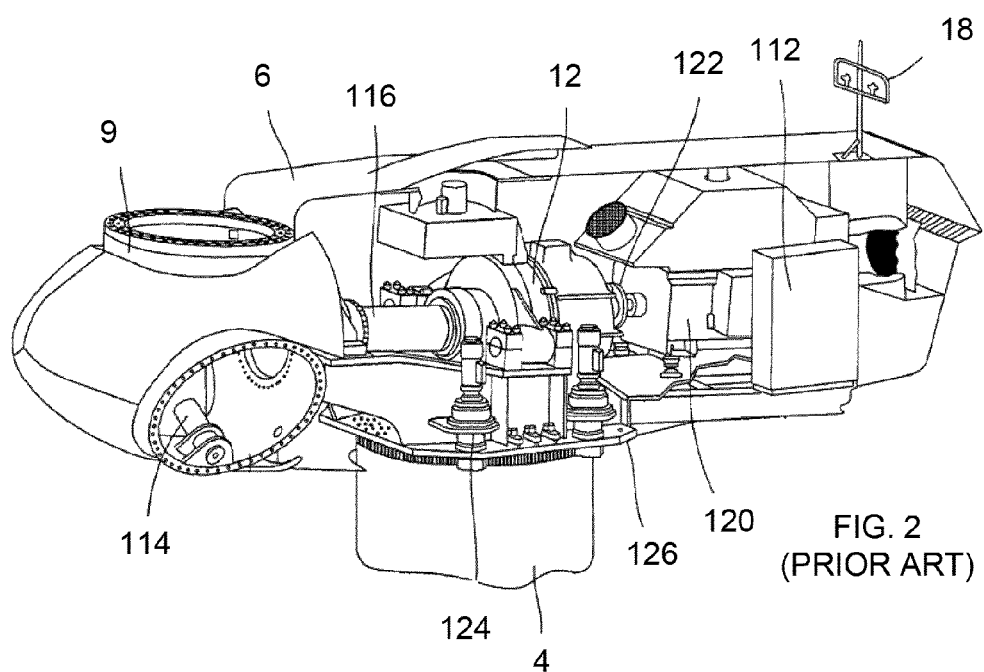
FIG. 2 is a cut-away orthographic view of the nacelle and hub of the conventional wind turbine shown in FIG. 1.
Figure 3:
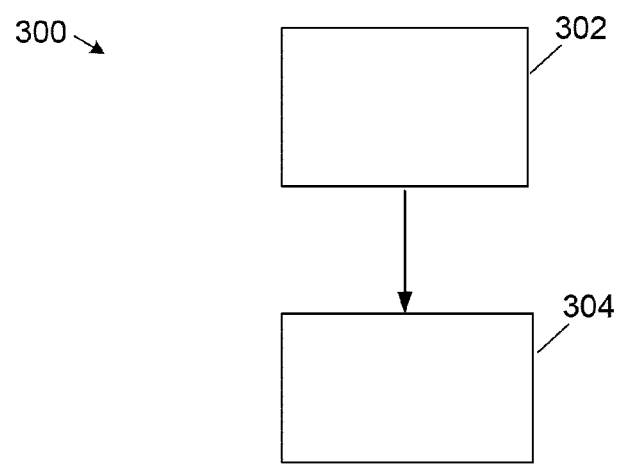
FIG. 3 is a schematic block diagram illustrating a method of operating a wind turbine.

FIG. 3 is a schematic block diagram 300 illustrating various methods of operating a wind turbine 2 having at least one blade 10, such as is illustrated in FIG. 1. However, the method may also be applied to various other wind turbines. The method includes the step 302 of sensing an icing hazard for the at least one blade, and the step 304 of moving the at least one blade into a position to reduce the icing hazard.

Figure 4:
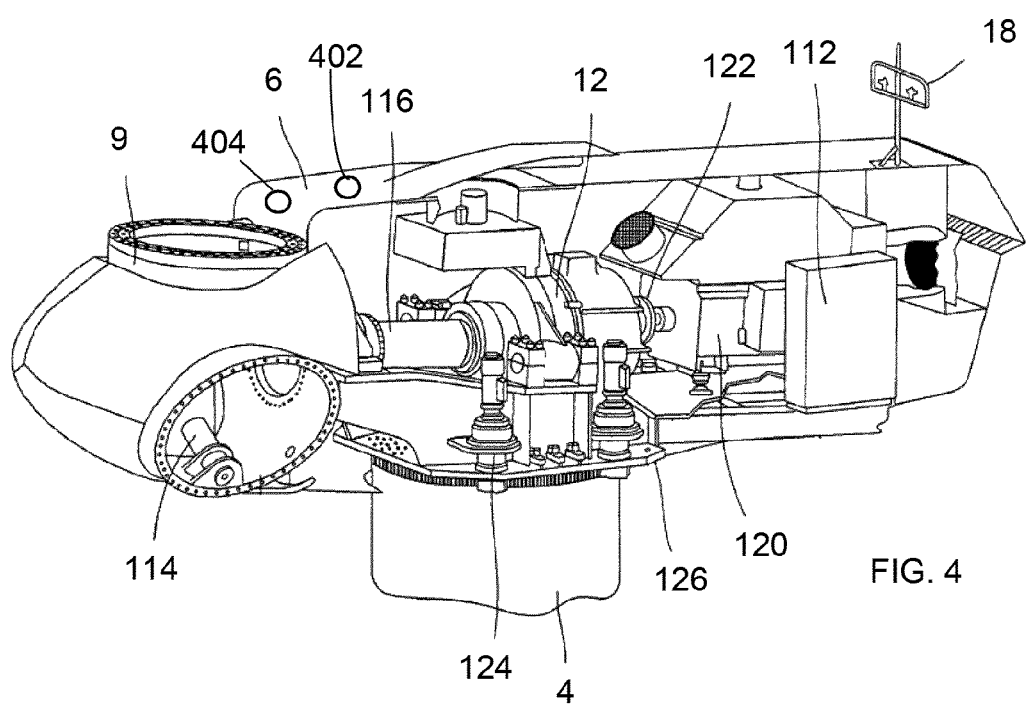
FIG. 4 is a cut-away orthographic view of a nacelle and hub of a wind turbine.

The sensed icing hazard may be indicative of current icing of the blades and/or predictive of future icing of the blades. For example, a current or future icing hazard may be sensed with a sensor 402 as shown in FIG. 4. In various embodiments the icing sensor 402 may sense temperature, humidity, barometric pressure and/or other metrological information. Visual sensing may also be used. Icing may also be inferred from blade vibration, reduced power production, and/or other operating parameters of the wind turbine 2. Some or all of the information may then be processed by the control system 16 in order to determine the likelihood that ice formation is or will affect the operation of the wind turbine 2.

One or more icing hazard sensors 402 may also be arranged on other parts of the wind turbine 2 besides the nacelle 6 such as one or more of the blades 10. In addition, the icing hazard sensor(s) 402 may be remote from the wind turbine 2, such as on a metrological mast or a remote metrological data collection station as might be operated by a weather service. Similarly, detectors of actual icing may be arranged on one or more of the blades 10 and/or other components of the wind turbine 2.

Once an icing hazard is detected, the blade 10 is then moved into a position to reduce the icing hazard at step 304 in FIG. 3. Any of the blades and/or rotor may be moved by the control system 16 or other means. For example, some or all of the blades 10 may be pitched to at or near a zero degrees position where they are substantially stalled. Alternatively, or in addition, the moving step 304 may include yawing the rotor substantially perpendicular to a wind direction in order to further reduce rotation of blades 10 that are iced or could become iced.

Before, after, or rather than yawing the rotor substantially perpendicular to a wind direction, the moving step 304 may also include yawing the rotor substantially into a direction of the sun, or sun direction, in order to enhance warming of the blades 10 and melting of any ice. For example, the position of the sun may be detected by a sun position sensor 404. For example the sun position sensor 404 may include a photo sensor, or the sun position may be inferred from the time of day. Although the sun position sensor 404 is illustrated near the rotor end of the nacelle 6, other locations may also be used, including remote from the wind turbine 2.

The blades 10 may be arranged at any pitch when yawed toward the sun, including at or near zero degrees pitch with a flat side of the blades facing the sun. Furthermore, one or more of the blades 10 may also be pitched 180 degrees in order to enhance warming of an opposite side of the blade. For example, each side of the blade 10 may receive a certain amount of time facing the sun depending upon the temperature, time of day, and/or other icing hazard conditions.

The technology discussed above provides various advantages over conventional wind turbine blade deicing approaches. For example, many of the method steps discussed above do not require significant structural changes to the wind turbine 2. Consequently the method discussed above is relatively easy to implement with existing control systems 16. Control of the blade pitch and rotor position allows icing to be reduced and deicing to be accelerated, resulting in reduced down time for hazardous icing conditions.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from the scope of protection defined solely by the proper construction of the following claims.

What is claimed is:

1. A method of operating a wind turbine including a rotor having at least one blade, comprising:
   sensing an icing hazard for the at least one blade; and
   moving the at least one blade into a position to reduce the icing hazard;
   wherein the moving step further comprises yawing the rotor substantially into a sun direction.

2. The method of claim 1, wherein the moving step comprises pitching the at least one blade to substantially zero degrees pitch.

3. The method of claim 1, wherein the moving step comprises yawing the rotor substantially perpendicular to a wind direction.

4. The method of claim 3, wherein the moving step further comprises pitching the at least one blade about 180 degrees.

5. The method of claim 2, wherein the moving step further comprises yawing the rotor substantially perpendicular to a wind direction.

6. The method of claim 5, wherein the moving step further comprises pitching the at least one blade about 180 degrees.

7. The method of claim 1, wherein the moving step further comprises pitching the at least one blade about 180 degrees.

8. The method of claim 2, wherein the moving step further comprises pitching the at least one blade about 180 degrees.

9. A wind turbine, comprising:
   a tower supporting a drive train with a gearbox and a generator;
   a hub arranged on one end of the drive train;
   at least one blade arrange on the hub for rotating the drive train;
   a sensor for detecting an icing hazard for the blade; and
   a control system for moving the at least one blade into a position to reduce the icing hazard;
   wherein the control system yaws the drive train substantially into a sun direction.

10. The wind turbine recited in claim 9, wherein the control system pitches the at least one blade at substantially zero degrees pitch.

11. The wind turbine of claim 9, wherein the control system yaws the drive train substantially perpendicular to a wind direction.

12. The wind turbine of claim 11, wherein the control system pitches the at least one blade about 180 degrees.

13. The wind turbine of claim 10, wherein the control system yaws the drive train substantially perpendicular to a wind direction.

14. The wind turbine of claim 13, wherein the control system pitches the at least one blade about 180 degrees.

15. The wind turbine of claim 9, wherein the control system pitches the at least one blade about 180 degrees.

16. The wind turbine of claim 10, wherein the control system pitches the at least one blade about 180 degrees.

* * * * *